United States Patent

Fukushima

[15] 3,639,037
[45] Feb. 1, 1972

[54] DIRECTIONAL OR REFLEXIVE PROJECTION SCREEN

[72] Inventor: Yoshio Fukushima, Tokyo, Japan
[73] Assignee: Kabushiki Kaisha Ricoh, Tokyo, Japan
[22] Filed: Feb. 25, 1970
[21] Appl. No.: 13,952

[30] Foreign Application Priority Data

Feb. 28, 1969 Japan........................44/15573

[52] U.S. Cl. ............................................350/126
[51] Int. Cl. .........................................G03b 21/60
[58] Field of Search.............350/126, 127, 129, 117, 262, 350/109

[56] References Cited

UNITED STATES PATENTS

| | | | |
|---|---|---|---|
| 1,998,054 | 4/1935 | McBurney | 350/126 |
| 3,468,681 | 9/1969 | Jaupin | 350/109 X |
| 2,706,262 | 4/1955 | Barnes | 350/126 X |

*Primary Examiner*—Louis R. Prince
*Assistant Examiner*—Denis E. Corr
*Attorney*—Burgess, Ryan and Wayne

[57] ABSTRACT

A directional or reflexive projection screen having a reflecting surface consisting of at least two or more kinds of glass beads having different refractive indexes. The optimum image viewing area may be arbitrarily adjusted.

2 Claims, 7 Drawing Figures

DIRECTIONAL OR REFLEXIVE PROJECTION SCREEN

BACKGROUND OF THE INVENTION

The present invention relates to generally a projection screen and more particularly to a directional or reflexive projection screen.

Usually a projection screen is used to redirect the light in the image projected by a color slide or cine projector for convenient observation. Generally such screens are of the light diffusion type such as white matte, but they have one distinct disadvantage that the observation of the image is most adversely affected when the light rays other than the image projection light from the projector are made incident upon the projection screen.

Except the special case such as using a translucent screen for observation of the image from the side away from the projector, there will arise no serious problem at all even when a projection screen is so arranged that only those adjacent to the projector can observe the image.

SUMMARY OF THE INVENTION

The present invention therefore relates to a directional or reflexive screen enabling an observer to view an image of relatively high luminance even in a room well illuminated by the sunshine or by other illumination means and more specifically a directional or reflexive screen consisting of a base or support such as white-colored matte and a multitude of glass beads overlaid in most intimate contact with each other upon the base so as not to overlie one upon the other so that the semispherical surface of the glass bead on the side of the base may be used as a reflecting surface, the glass beads consisting of at least two or more kinds of glass beads having different refractive indexes.

When the directional or reflexive screen in accordance with the present invention is used, the image can be viewed very clearly as far as the external light rays (the rays other than the image projection light rays) are not made incident upon the screen in the same direction of the projection light rays. Even in an illuminated room, the observation of the image upon the screen is not adversely affected by the illumination light rays. Those who are within a relatively confined viewing angle about the projector may view the image of sufficiently high luminance. Because of the selection of kinds of glass beads having different refractive indexes and the combinations thereof in suitable mixing ratios, a confined viewing angle may be arbitrarily selected thereby providing an optimum projection screen for a desired projection purpose.

The above and other objects, features and advantages of the present invention will become more apparent from the following description of some illustrative embodiments thereof taken in conjunction with the accompanying drawing.

DESCRIPTION OF THE PREFERRED EMBODIMENT

FIGS. 1 to 5 illustrate the reflections of parallel incident light rays upon glass beads having refractive indexes ranging from 1.5 to 1.9 and the distributions of luminance or light distribution characteristics upon a plane spaced apart from the glass beads by a predetermined distance. It is readily seen that the higher the refractive index, the more light is reflected back toward a light source. When a screen is made of glass beads having a refractive index of 1.7, the light is mostly reflected back within an angle of about 8° relative to the parallel incident light rays (See FIG. 3) so that when the projection is made from a position spaced apart from the screen by 2 m., the brighter image may be viewed along the periphery of a confined area of a radius of 28 cm. about the projection position. When the eyes are positioned outwardly or inwardly of this periphery, the image viewed becomes darker or less bright. When the screen is made of glass beads having a refractive index of 1.9, the bright image can be viewed only in a very confined area adjacent to the projector (See FIG. 5). Throughout the FIGS. 1 to 5, the uppermost parallel incident light rays which are made incident upon the boundary and the area adjacent thereof of the reflecting surfaces of glass beads are reflected back in the directions considerably different from the directions of the major reflected light rays, but the luminance of these minor reflected light rays is such an extent that the viewing of an image is not adversely affected.

Figure 1:
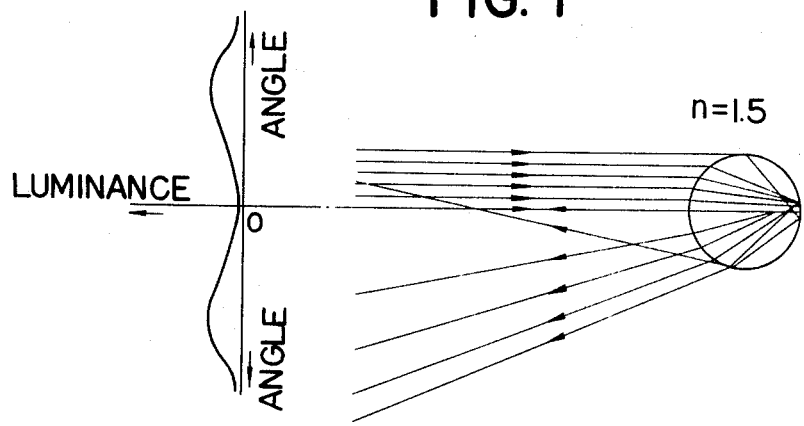
FIGS. 1 to 5 illustrate the directions of reflected light rays of parallel light rays made incident upon glass beads having different refractive indexes and the luminance distributions of reflected light rays upon a plane spaced apart from the screen by the same distance.
Figure 2:
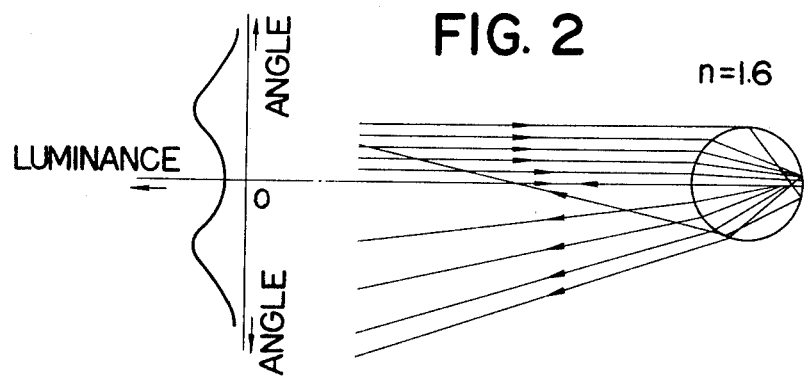
Figure 3:
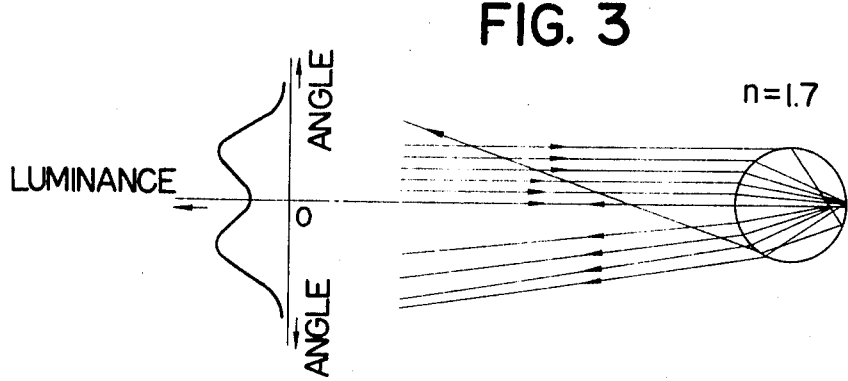
Figure 4:
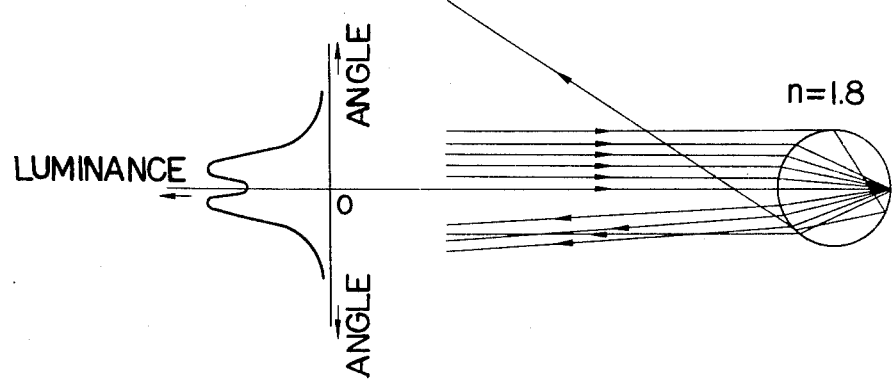
Figure 5:
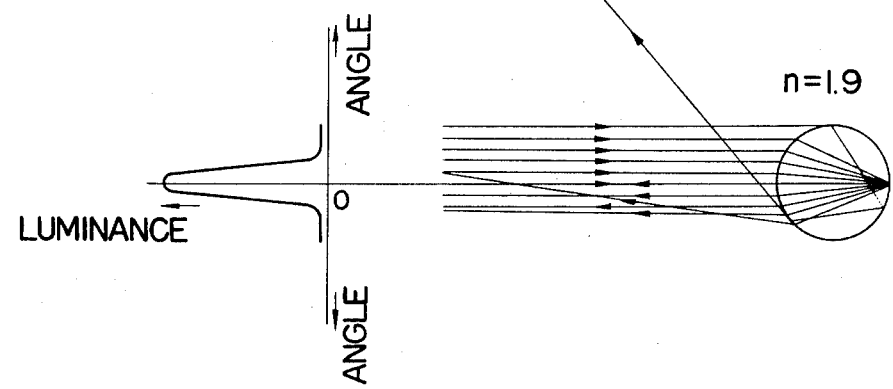
Figure 6:
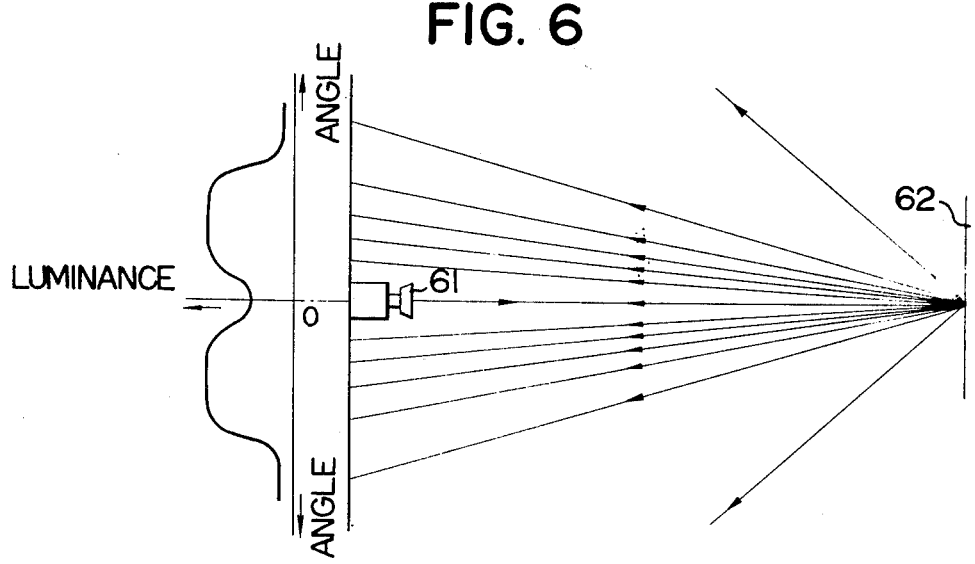
FIG. 6 is a diagrammatic view illustrating the light distribution or luminance distribution of the reflected light rays redirected by the screen of the present invention.

As described hereinabove, the glass bead having a specific refractive index exhibits its unique light refractive or reflection characteristic. In view of the above, the present invention contemplates to use glass beads having different refractive indexes so that the light refractive or reflection characteristics of these glass beads may be well compensated, thereby obtaining a substantially uniform luminance distribution of the reflected light within a predetermined area confined by a given angle from a projector lens 61 as shown in FIG. 6. Reference numeral 62 designates a directional or reflexive screen in accordance with the present invention. More specifically, in the screen consisting of three kinds of glass beads having refractive indexes of 1.5, 1.6 and 1.7 with a mixing ratio of 7:3:1, a substantially uniform luminance image may be viewed in a somewhat doughnut ring area about the projection lens having an inner diameter of about 25 cm. and an outer diameter of about 80 cm. when the projector is spaced apart from the screen by 2 m. When the distance between the projector and the projection screen is shorter as in the case described hereinbefore, the exit angle or the angle of the reflected light relative to the incident light may be larger so that glass beads having a relatively low-refractive index may be advantageously used. On the other hand, when the distance between the projector and the screen becomes longer, the combination of glass beads having higher refractive indexes such as 1.7 and 1.8 may be used. If required, glass beads having a medium refractive index may be mixed with them.

Figure 7:
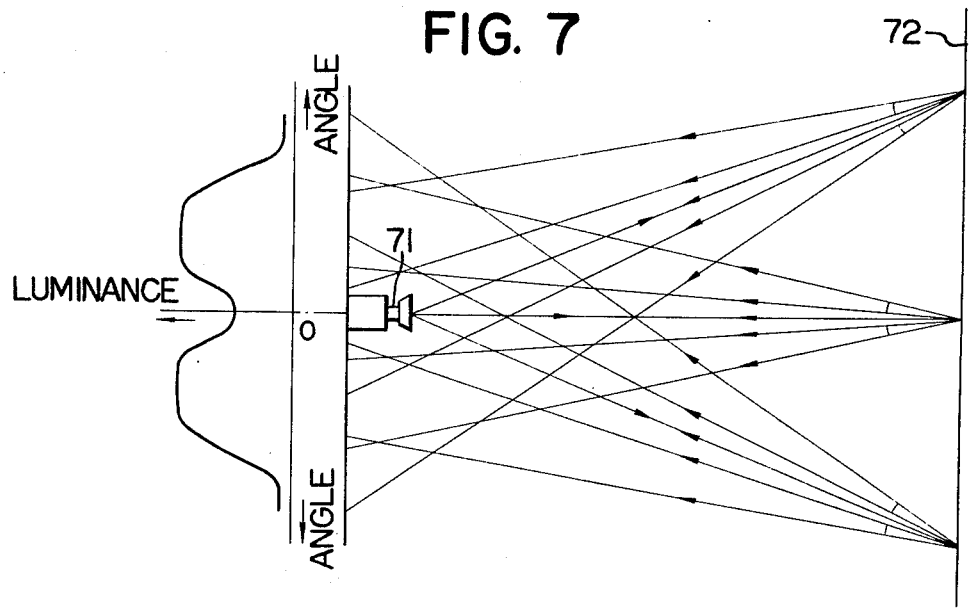
FIG. 7 is a diagrammatic view illustrating the projection of a slide upon the screen of the present invention.

FIG. 7 illustrates an arrangement in which the observers around the projection lens 71 may view the bright image projected over the screen 72. It is preferable that the diameters of glass beads are so selected as to be sufficiently smaller as compared with the resolution power of the eyes.

I claim:

1. a directional projection screen having a reflecting surface comprising
    a plurality of glass beads;
    said glass beads provided in at least two separate groups;
    the heads of each said group having essentially the same refractive index of a value in the range of 1 to 2;
    the index of refraction of the groups being different; and
    said groups are provided in a predetermined mixing ratio whereby to confine the reflected light to a predetermined viewing angle.

2. A directional projection screen according to claim 2 in which at least three groups of glass beads are provided having respective refractive indexes of 1.5, 1.6 and 1.7, and said groups are provided in a mixing ratio of 7:3:1.

* * * * *